US007436136B2

(12) United States Patent
Rhodes

(10) Patent No.: US 7,436,136 B2
(45) Date of Patent: Oct. 14, 2008

(54) CAMERA BASED ANTI-PINCH SYSTEM

(75) Inventor: Christopher David Rhodes, Orleans (FR)

(73) Assignee: ArvinMeritor Light Vehicle Systems - France, Sully-sur-Loire (FR)

(*) Notice: Subject to any disclaimer, the term of this patent is extended or adjusted under 35 U.S.C. 154(b) by 219 days.

(21) Appl. No.: 11/527,091

(22) Filed: Sep. 26, 2006

(65) Prior Publication Data

US 2008/0074067 A1 Mar. 27, 2008

(51) Int. Cl.
*H02P 3/00* (2006.01)

(52) U.S. Cl. ........................ 318/280; 318/466; 318/369; 348/143; 382/154; 428/193

(58) Field of Classification Search ................. 318/466, 318/280, 369, 445; 428/193; 348/143; 382/154
See application file for complete search history.

(56) References Cited

U.S. PATENT DOCUMENTS 6,600,509 B1 * 7/2003 Radford et al. ............. 348/143
2002/0047678 A1 * 4/2002 Wilson ........................ 318/445
2002/0116106 A1 * 8/2002 Breed et al. .................... 701/45
2004/0145457 A1 * 7/2004 Schofield et al. ......... 340/425.5
2004/0161246 A1 * 8/2004 Matsushita et al. .......... 398/187
2005/0079326 A1 * 4/2005 Varaprasad et al. ......... 428/193
2005/0231147 A1 * 10/2005 Urman et al. ............... 318/465
2006/0171704 A1 * 8/2006 Bingle et al. ................ 396/419

* cited by examiner

*Primary Examiner*—Rita Leykin
(74) *Attorney, Agent, or Firm*—Carlson, Gaskey & Olds, PC

(57) ABSTRACT

An anti-pinch control system is used to identify obstructions in a path of movement for a powered vehicle member, such as a vehicle window for example. A pinching area is identified for the vehicle window and at least one indicium or indicator is mounted to a vehicle structure to be in view of a camera. The indicium is positioned such that no object may pass into the pinching area without also passing between the camera and at least a portion of the indicium. The camera identifies an obstruction when any portion of the indicium is obscured. This indicium includes a plurality of predefined zones, with each zone being associated with an operational function, such as upward window movement, downward window movement, door locking, side mirror movement, etc. This eliminates the need for separate switches to perform each of these functions thereby reducing overall cost for a vehicle door system.

20 Claims, 1 Drawing Sheet

CAMERA BASED ANTI-PINCH SYSTEM

TECHNICAL FIELD

An anti-pinch control utilizes a camera, which cooperates with function control indicator, to control movement of a powered vehicle component.

BACKGROUND OF THE INVENTION

Anti-pinch control systems are used to control movement of a powered vehicle component, such as a vehicle window for example, such that an object does not become pinched or caught between the vehicle window and a vehicle structure. Typically, a motor cooperates with a window regulator assembly to move the vehicle window between opened and closed positions. The anti-pinch control system works with the motor and window regulator assembly to stop or reverse window movement once an obstruction is detected.

Many different anti-pinch control systems have been utilized to address this common problem. Many of these systems focus on controlling or monitoring motor characteristics to determine if there is an obstruction. These systems often do not work effectively to provide desired window movement control for various different operational conditions. Some systems are too sensitive, often resulting in a stoppage of window movement when there is no obstruction. Other systems are not sensitive enough, causing injury because the window was not stopped soon enough.

One proposed solution has been to use a camera to identify when an obstruction is present. A camera based anti-pinch control system is very effective and accurate. However, these systems are also very costly to implement.

Thus, there is a need for an effective camera based anti-pinch control system that is not as cost prohibitive as prior systems.

SUMMARY OF THE INVENTION

The subject invention provides an anti-pinch control system that is used to identify obstructions in a path of movement of a powered vehicle component relative to a vehicle structure. A pinching area is identified for the powered vehicle component and at least one indicium is mounted to a vehicle structure to be in view of a camera. The camera identifies an obstruction when any portion of the indicium is obscured.

In one example, the at least one indicium is a component function control strip that is mounted to the vehicle structure in view of the camera. The component function control strip includes a plurality of predefined zones, with each zone being associated with an operational function/command of the same powered vehicle component or another vehicle component.

In one example, the powered vehicle component comprises a vehicle window and vehicle structure defines an opening having at least one edge. The pinching area is defined as being along at least one edge of the opening, and can often be defined along more than one edge. The component function control strip is mounted along at least one edge of the opening that is associated with the pinching area. The camera is mounted to a vehicle structure at a position remote from locations where the strips are, such that the camera is easily able to identify when any portion of the component function control strip is obscured.

Each of the plurality of predefined zones is associated with an operational function/command for the vehicle window or another vehicle component. These operational functions/ commands could include upward window movement, downward window movement, door locking, side mirror movement, etc., for example. This eliminates the need for separate switches in a vehicle door assembly to perform each of these functions, resulting in reduced cost for a vehicle door system, which in turn makes a camera based anti-pinch more economically viable.

The subject invention provides a camera based system that cooperates with a component function control strip to achieve effective and accurate anti-pinch performance. Use of the component function control strip eliminates the need for expensive operational switches that have traditionally been use for controlling component operational functions, resulting in reduced overall system cost for a door. These and other features of the present invention can be best understood from the following specification and drawings, the following of which is a brief description.

DETAILED DESCRIPTION OF THE PREFERRED EMBODIMENT

Figure 1:
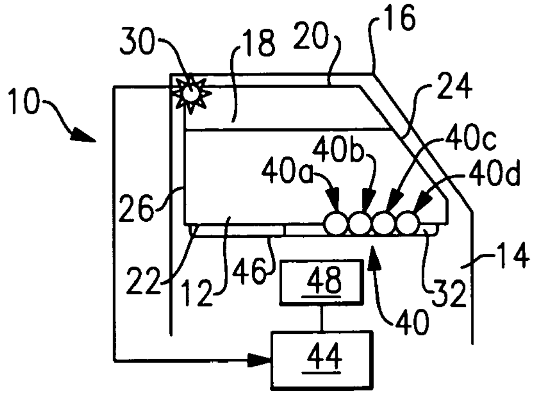
FIG. 1 is a schematic representation of an anti-pinch control system incorporating the subject invention.

An anti-pinch control system for a powered vehicle member having a pinching area is shown generally at 10 in FIG. 1. In the example shown, the powered vehicle member comprises a window 12 mounted within a vehicle door 14; however, the powered vehicle member could comprise other vehicle components such as sliding vehicle doors, sunroofs, etc., for example. The pinching area is defined as any area where there is a risk of pinching between the window 12 and a vehicle structure, such as a window frame 16 in this example.

The vehicle door 14 defines an opening 18 with a plurality of edges. The opening includes at least a top edge 20, a bottom edge 22, a front edge 24, and rear edge 26. In the example shown in the figures, the pinching area is defined as being at least along the top edge 20 and the front edge 24. It should be understood that this is just one example location of a pinching area, and that the location could vary depending on the type of component involved and the mounting configuration of that component in the vehicle.

Figure 2:
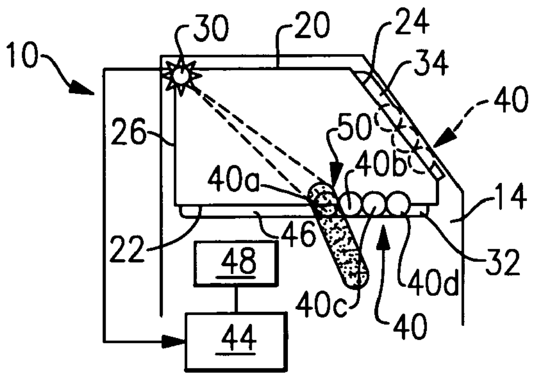
FIG. 2 is a schematic representation of a first operational example for the anti-pinch control system of FIG. 1, and shows an alternate additional zone.
Figure 3:
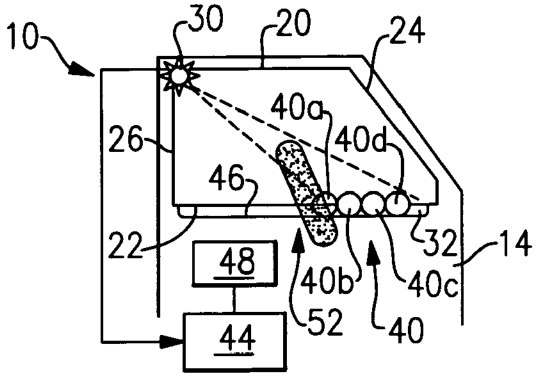
FIG. 3 is a schematic representation of a second operational example for the anti-pinch control system of FIG. 1.
Figure 4:
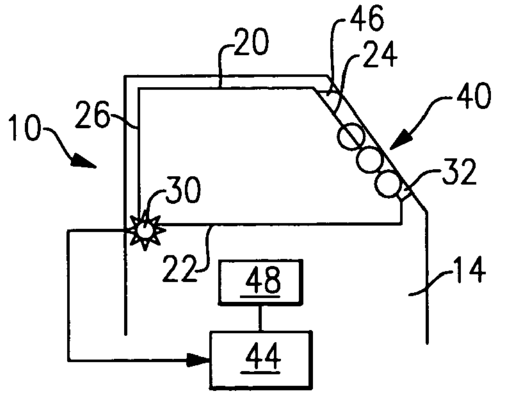
FIG. 4 is a schematic representation of another example of an anti-pinch control system incorporating the subject invention.
Figure 5:
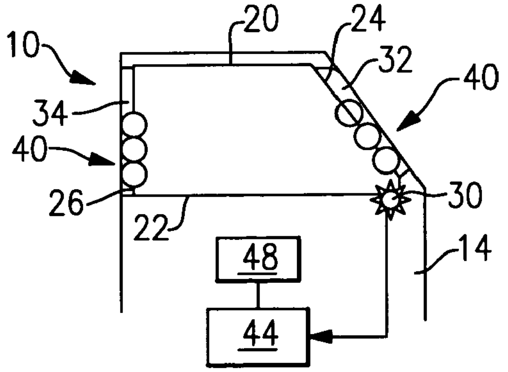
FIG. 5 is a schematic representation of another example of an anti-pinch control system incorporating the subject invention.

The anti-pinch control system 10 includes a camera 30 that is mounted to a vehicle structure. In the example shown, the camera 30 is mounted to the vehicle door 14 at the window frame 16; however, the camera 30 could be mounted to vehicle structures other than the door 14 or window frame 16. FIGS. 1-3 show an example camera position near an intersection of the top 20 and rear 26 edges. FIG. 4 shows an example camera position near the bottom 22 and rear 26 edges, and FIG. 5 shows an example camera position near the bottom 22 and front 24 edges.

An indicium or indicator is mounted to a vehicle structure to be in view of the camera 30 and includes zones that identify/specify vehicle component operational functions. The at least one indicium could comprise a plurality of discrete elements that are mounted to the vehicle structure, or can be an integrated element including a plurality features for performing multiple vehicle operational functions. This will be discussed in greater detail below.

In the examples shown, the indicia comprises at least one strip 32 that is mounted to the door 14 at a location remote from the camera 30 such that the strip 32 is in view of the camera 30. The strip 32 is mounted to at least one of the edges 20, 22, 24, 26 and is positioned such that an object cannot pass into the pinching area without also passing between the camera 30 and at least a portion of the strip 32.

In the example of FIG. 1, the strip 32 is mounted only along the bottom edge 22 at a position remote from the pinching area at the top 20 and front 24 edges. Optionally, the strip 32 can comprise a primary strip and can include an additional strip 34 that would be mounted adjacent to the primary strip or on another edge, which may or may not be within the pinching area. In FIG. 2, the additional strip 34 is mounted along the front edge 24, which is part of the pinching area, and is used in combination with strip 32 that extends along the bottom edge 22. FIG. 4 shows a configuration where the strip 32 is mounted only to a front edge 24, and FIG. 5 shows a configuration where the strip 32 is mounted to the rear edge 26 and the additional strip 34 is mounted to the front edge 24. Additional strips beyond strips 32, 34 could also be used. Further, the strips 32, 34 can be formed as separate pieces or can be formed together as a single piece component.

In any of the configurations discussed above, at least the primary strip 32 comprises a command strip and includes at least one predefined zone 40 that is associated with a component operational function/command. The additional strip 34, sometimes referred to as a pinch strip, may or may not also include such a zone or zones. In the example shown, the primary strip 32 includes a plurality of predefined zones 40*a*, 40*b*, 40*c*, 40*d*, with each zone 40*a*, 40*b*, 40*c*, 40*d* being associated with one component operational function. These operational functions/commands could include upward window movement, downward window movement, door locking, side mirror movement, etc., for example. The incorporation of these types of zones 40*a*, 40*b*, 40*c*, 40*d* into the strip 32 eliminates the need for separate switches in a vehicle door assembly to perform each of these functions. This significantly reduces cost for a vehicle door system.

As shown in FIG. 1, the strip 32 extends substantially along the entirety of the bottom edge 22, however, the predefined zones 40*a*, 40*b*, 40*c*, 40*d* are generally grouped together along a specified segment of the bottom edge 22 where the zones 40*a*, 40*b*, 40*c*, 40*d* are easily accessible by a user. Thus, there is a portion 46 of the strip 32 that is not associated with a zone.

A controller 44 receives input from the camera 30 and identifies an obstruction when any portion of the strips 32 and/or 34 associated with an anti-pinch function is obscured while the window 12 is moving in a manner that could cause pinching, generally this movement would be towards a closed position. If an obstruction is detected, the controller 44 generates a command to a powered window regulator assembly 48 to slow, halt, or reverse movement of the window 12. The window regulator assembly 48 is powered to move the window 12 between open and closed positions as known. Any type of window regulator assembly 48 can be used with the subject anti-pinch control system 10. As well as providing simple anti-pinch protection, an obstruction detection where the window 12 does not even touch an obstacle could be used as a separate command, notably as a principal stop command for window motion.

If the window 12 is stationary or moving in a manner that could not cause pinching (generally such movement would be toward the open position), and a first zone 40*a* is touched, i.e. the first zone 40*a* is obscured from view of the camera 30 as shown in at 50 FIG. 2, a corresponding component operational function/command is activated/generated. If the first zone 40*a* were associated with a window down command, for example, obscuring the first zone 40*a* would result in the window moving downward. If the window 12 is stationary and a second zone 40*b* is obscured, a different component operational function/command is activated. If the window 12 is stationary and a third zone 40*c* is obscured, a different component operational function/command is activated, etc.

If the window 12 is stationary and more than one zone 40*a*, 40*b*, 40*c*, 40*d* is obscured, or if one zone and part of portion 46 are both obscured as indicated at 52 in FIG. 3, then no operational functions/commands are activated. By properly spacing the zones 40*a*, 40*b*, 40*c*, 40*d* along the strip 32, any overlap or zone confusion can be avoided.

The strip 32 can be made from any material suitable for mounting within a vehicle and which would be easily distinguished by the camera 30. The controller 44 receives input from the camera 30 and cooperates with various control systems to move the window 12 upward, move the window 12 downward, lock the door 14, move a mirror, etc., as each zone 40*a*, 40*b*, 40*c*, 40*d* is selected. One of ordinary skill in the art would be able to provide software for the controller 44 to accomplish these control functions.

In one example configuration, the controller 44 delays initiation of the component operational function for a predetermined amount of time when the associated predefined zone is obscured while the window 12 is stationary. For example, assume a vehicle ignition is activated, i.e. the camera 30 is on, and the window 12 is stationary in a partially or fully open position. The user selects a desired function by placing a finger over a desired zone, such as the first zone 40*a* (window up) or the second zone 40*b* (window down), for example. The camera 30 registers the selection but the controller 44 does not immediately activate the desired command. The user removes the finger from the desired zone and the controller 44 ignores any signal from the camera 30 indicating an obstruction of multiple zones or the portion 46 of the strip 32 for a brief period of time because this occurs directly following a registered command. Thus, the controller 44 waits for a brief amount of time to allow the user to fully withdraw from the selected zone. This amount of time could be approximately one second or less. Once the delay has passed, the controller 44 activates the registered command and the window 12 begins to move. Any subsequent obstruction of the strip 32 will stop or slow the window 12 as discussed above. The time lapse prevents the erroneous detection of an obstruction as the user withdraws from the controlled zone.

In one example configuration, the controller 44 utilizes the camera information with window positional information to identify an obstruction that would be outside an instantaneous pinch risk zone. The instantaneous pinch risk zone is where pinching could occur at a given instant and would depend on a position of the window, thus certain zones within the opening may change from being inside the instantaneous pinch risk zone to outside the instantaneous pinch risk zone depending on where the window is during travel. For example, if the window 12 is not close to this zone and an obstruction is identified by the camera, the controller can determine that it is not currently necessary to stop moving the window.

It should be understood that the controller 44 could be incorporated into the system as part of the camera 30 or could be a separated, dedicated controller mounted anywhere within the vehicle. Optionally, the controller 44 could be part of a vehicle centralized control unit that controls multiple vehicle systems.

The subject camera based anti-pinch control system utilizes a multi-function control strip that is used to identify control commands traditional activated by individual switches. The cost saving resulting from the elimination of these switches increases the economic viability of using a camera based anti-pinch control system. Further, removal of these individual switches from an inner trim panel of the door provides increased styling freedom.

All previous references to obscuring the strip 32 should also be interpreted to include any readily identifiable modification to the strip. Examples would be thickening, thinning or locally deforming or deviating the strip 32.

Figure 6:
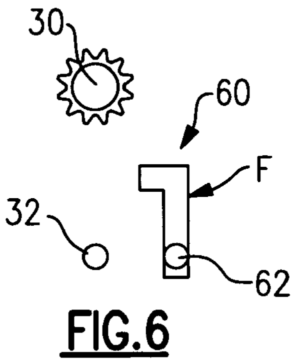
FIG. 6 is a schematic representation of a "false" switch as applied to an anti-pinch control system incorporating the subject invention.

In an additional embodiment, the obscuring or identifiably modifying the strip 32 in the functional zones could be accomplished by using an intermediate member or system. As shown in FIG. 6, this would permit the use of "false" switches 60 (i.e. switches that do not require electrical elements or connections) which would maintain traditional tactile sensations associated by users with a switch, while eliminating the majority of the cost. Such a system could also simplify detection by distancing the user from the strip 32 during command activation and providing highly repeatable command signals. In the example, shown, a user would apply an input F to the false switch 60, which would have a spring biased pivot 62. The camera 30 would identify the proper control function request, and the user would experience the sensation of actuating a switch.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An anti-pinch control system for a powered vehicle member having a pinching area comprising:

a camera;

at least one indicium mounted to a vehicle structure in view of said camera such that an object may not pass into the pinching area without passing between said camera and at least a portion of said at least one indicium, said at least one indicium including at least one predefined zone for actuating a component operational function; and a controller that identifies an obstruction when any portion of said at least one indicium is obscured.

2. The anti-pinch control system according to claim 1 wherein said at least one indicium comprises a strip of material mounted to the vehicle structure, and which includes said at least one predefined zone.

3. The anti-pinch control system according to claim 1 wherein the component operational function comprises at least one of movement of the powered vehicle member in a first direction, movement of the powered vehicle member in a second direction opposite of the first direction, and a control function for at least one other vehicle component.

4. The anti-pinch control system according to claim 2 wherein said at least one predefined zone comprises a plurality of predefined zones with each zone being associated with one component operational function such that when one zone is obscured by a user, an associated one operational command is generated to perform one component operational function.

5. The anti-pinch control system according to claim 1 wherein said controller allows the component operational function for any powered vehicle member to be performed when only one predefined zone is obscured and the powered vehicle member protected by said camera is stationary.

6. The anti-pinch control system according to claim 5 wherein said controller delays initiation of the component operational function when the at least one predefined zone is obscured and the powered vehicle member is stationary for a predetermined amount of time.

7. The anti-pinch control system according to claim 6 wherein the predetermined amount of time is less than one second.

8. The anti-pinch control system according to claim 1 wherein the powered vehicle member comprises a vehicle window mounted for movement relative to a vehicle structure and said at least one indicium comprises at least one strip that is mounted to the vehicle structure.

9. The anti-pinch control system according to claim 8 wherein said at least one predefined zone comprises at least a first zone and a second zone and wherein the vehicle window moves in a first direction when the first zone is obscured and the vehicle window moves in a second direction opposite of the first direction when the second zone is obscured.

10. The anti-pinch control system according to claim 9 wherein movement of the vehicle window between opened and closed positions is solely controlled by obscuring the first and second zones.

11. The anti-pinch control system according to claim 9 wherein the vehicle structure comprises at least one of a mechanical indicium obstructor and modifier that do not include electrical contact switches.

12. The anti-pinch control system according to claim 8 wherein the vehicle structure defines an opening having at least one edge, and wherein the pinching area is defined along the at least one edge.

13. The anti-pinch control system according to claim 12 wherein the camera is mounted to the vehicle structure at a position remote from said at least one strip.

14. The anti-pinch control system according to claim 8 wherein the vehicle structure comprises a switchless vehicle door assembly.

15. A method of controlling movement of a powered member relative to a vehicle structure comprising the steps of:

(a) identifying a pinching area on the vehicle structure;

(b) mounting at least one indicium at least partially along at least one edge of the vehicle structure wherein the at least one indicium includes at least one predefined zone that is associated with a component operational function;

(c) using a camera to identify an obstruction when any portion of the at least one indicium is obscured; and (d) controlling movement of the powered member in response to an anti-pinch command issued by a controller once an obstruction is identified in step (c).

16. The method according to claim 15 including obscuring the at least one predefined zone while the powered member is stationary to activate the component operational function.

17. The method according to claim 16 including delaying activation for a predetermined amount of time prior to activating the component operational function.

18. The method according to claim 15 wherein the component operational function comprises movement of the powered member relative to the vehicle structure.

19. The method according to claim 17 wherein the at least one predefined zone comprises a plurality of predefined zones each being associated with one component operational function, and including the step of obscuring a desired predefined zone while the powered member is stationary to operate a desired component operational function.

20. The method according to claim 15 wherein the vehicle powered member comprises a vehicle window and the at least one indicium comprises at least one strip of material, and wherein the vehicle structure defines an opening having a plurality of edges, and including defining the pinching area as being along the at least one edge of the plurality of edges, and mounting the at least one strip of material along at least one edge of the plurality of edges.

* * * * *